United States Patent [19]

Shibata et al.

[11] Patent Number: 4,667,082

[45] Date of Patent: May 19, 1987

[54] WELDING POSITION DETECTING APPARATUS

[75] Inventors: Nobuo Shibata; Akira Hirai, both of Ibaraki; Jun Nakajima, Chiba; Kenji Mori, Tsuchiura; Toshio Akatsu, Ibaraki, all of Japan

[73] Assignee: Hitachi, Ltd., Tokyo, Japan

[21] Appl. No.: 812,844

[22] Filed: Dec. 23, 1985

[30] Foreign Application Priority Data

Dec. 27, 1984 [JP] Japan .................. 59-273597

[51] Int. Cl.$^4$ .............................................. B23K 9/10
[52] U.S. Cl. .................................. 219/124.34; 901/42; 901/47
[58] Field of Search .............. 219/124.34; 901/42, 901/47; 318/577

[56] References Cited

U.S. PATENT DOCUMENTS

| | | | |
|---|---|---|---|
| 4,450,339 | 5/1984 | Corby, Jr. ................... | 219/124.34 |
| 4,491,719 | 1/1985 | Corby, Jr. ................... | 219/124.34 |
| 4,532,405 | 7/1985 | Corby, Jr. et al. ............. | 219/124.34 |

FOREIGN PATENT DOCUMENTS 55-50984  4/1980  Japan .

*Primary Examiner*—Clifford C. Shaw
*Attorney, Agent, or Firm*—Antonelli, Terry & Wands

[57] ABSTRACT

A welding position detecting apparatus provided on a welding torch which forms an arc between a welding wire and a groove face on a work piece. The apparatus has an optical system for irradiating the groove face with a converging ray at a point in advance of the point of the arc so as to form a groove face crossing image, and an observing optical system which introduces this groove face crossing image and an arc image into its field of view and by which the groove face crossing image and the arc image are detected at the same time.

14 Claims, 4 Drawing Figures

WELDING POSITION DETECTING APPARATUS

BACKGROUND OF THE INVENTION

1. Field of Utilization of the Invention

The present invention relates to a welding position detecting apparatus which detects by using an optical system an arc image and a groove face crossing ray image of work piece and is suitable for a welding line tracing apparatus provided in a fully automatic arc welding robot.

2. Description of Prior Art

As disclosed in Japanese Patent Laid-open Publication No. 50984/1980, there is one conventional welding position detecting apparatus which uses an optical system, in which a groove face of a work piece is irradiated with a fine laser ray which is emitted from an emitting means so as to obliquely descend and accurately converge, whereupon a reflection from the groove face is detected by a light receiving means such as an ITV camera, and a welding position on the work piece is determined by analyzing the image received by the light receiving means.

In the case of application of this apparatus to a fully automatic arc welding robot for control of a welding torch, two methods have been possible. In one method, the groove face is traced to obtain the information about the groove face and this is put in an external memory, the welding torch being controlled on the basis of this information during the welding process. In the second method, and the processes of welding and tracing the groove face surface are performed in sequence, the torch thus being controlled.

However, these methods do not ensure that the welding torch accurately traces the welding line, because, in the conventional apparatus, the tip of the welding wire is not directly observed, so that the changing amounts of extension and bending are not detected.

Another known example is disclosed in U.S. Pat. No. 4,450,339, in which a light (an arc) emitted from an arc point in a welding process is introduced into a receiving means through a group of filters, and an image obtained by the receiving means is analyzed so as to determine the point of arc emission on the tip of a welding wire.

This apparatus has enabled detection of amounts of extension and bending of the wire, but detection of the relationship between the positions of the welding torch and the work piece has still not been possible. Thus, it has not been possible to use this apparatus in detecting a welding line to be traced. It is believed that a device for detecting the position of the groove face by using the arc itself as a light source is employed together with this apparatus. However, the operation of level setting in the observation system is difficult due to the large variations in the intensity of the arc.

According to one possible idea, the apparatuses respectively shown in FIGS. 5 and 6 may be connected together to form one welding position detecting apparatus for the purpose of eliminating all the defects described above. However, the apparatus would then become too large and complicated to be used in practice.

SUMMARY OF THE INVENTION

The present invention has been developed for the purpose of eliminating these defects and of providing a welding position detecting apparatus suitable for a fully automatic arc welding robot which may be applied to the detection of a welding line in addition to the detection of amounts of extension and bending of a welding wire and which is capable of performing these tasks with an apparatus that has simple construction and is small in size.

The apparatus according to the present invention is arranged as follows. While the arc is being observed by using an observing optical system, a groove face which precedes the arc point and is generally in the vicinity of the same is irradiated with a fine ray of converging light and a reflection from this groove face is observed through the observing optical system, this observation being simultaneous with the observation of the arc. An arc image and a groove face crossing ray image immediately come into the field of view of a two-dimensional raying point detecting device of one observing optical system. The apparatus is arranged in such a manner so as to be able to detect both images at the same time in a system having a simple construction, and may be effective in automating an arc welding process.

DETAILED DESCRIPTION OF THE PREFERRED EMBODIMENT

Figure 1:
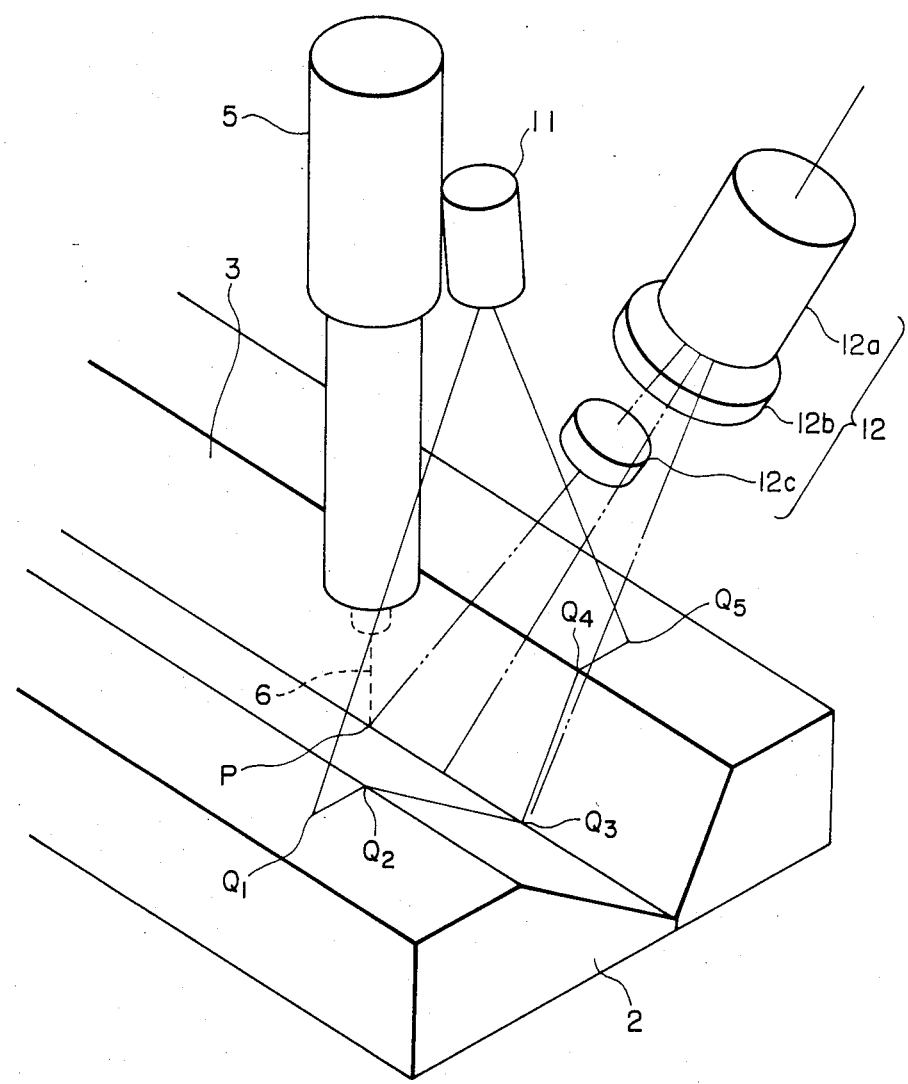
FIG. 1 is a schematic perspective illustration of one embodiment of the present invention.

FIG. 1 schematically shows a welding position detecting apparatus embodying the present invention.

A welding torch 5 of a welding apparatus not shown in the figure is attached to a wrist portion of a welding robot, and is movable along a groove face 3 of a work piece 2 in a predetermined positional relationship therewith when the welding robot is operated.

A fine converging ray emitting optical system 11 has a light emitting element such as a light emitting diode and a laser diode and irradiates the groove face 3 with a fine converging ray. The targe of this ray is in the vicinity of an arc point P and in a position in advance of the same.

An observing optical system 12 is composed of a two-dimensional ray point detector 12a including e.g. an ITV camera or a CCD sensor, an interface filter 12b and an extinction-filter 12c, etc. In this observing optical system 12, the detector 12a, an interference filter 12b and the extinction-filter 12c are selected, disposed, positioned and adjusted in alignment of their optical axes in order that the light of the arc point (an arc) together with the reflective light of the fine converging ray on the groove face 3 may be led to a light receiving surface of the detector 12a. In this case, the optical axis of the detector 12a is directed toward the central point between the arc point P and the point of reflection of the fine converging ray on the groove face 3, and the distance between the central point and the detector 12a is properly adjusted so as to lead the arc and the reflective light to the light receiving surface of the detector 12a.

A line segment $Q_1$–$Q_5$ indicates a groove face crossing ray line along which the fine converging ray emitted from the optical system 11 strikes the groove face 3.

A present invention provides an arrangement as described above and shown in FIG. 1, in which the arc image and the groove face crossing ray image immediately come into the field of view of the observing optical system 12 and both images are thus detected at the same time. In this case, the detector 12a detects the groove face crossing ray image from the groove face 3 by introducing the reflective light reflected on the portion of the groove face crossing ray line into the detector 12a through the interference filter 12b, the latter having the characteristic of permitting to pass therethrough light which has a wavelength range equal to that of the fine converging ray. After the arc is diminished through the extinction-filter 12c to a degree substantially equal to the intensity of scattered light reflected from the groove face crossing ray line portion, the groove face crossing ray image is introduced into the detector 12a through the interference filter 12b and is detected by the detector 12a, the process of detecting the groove face crossing ray image being performed at the same time.

Figure 2:
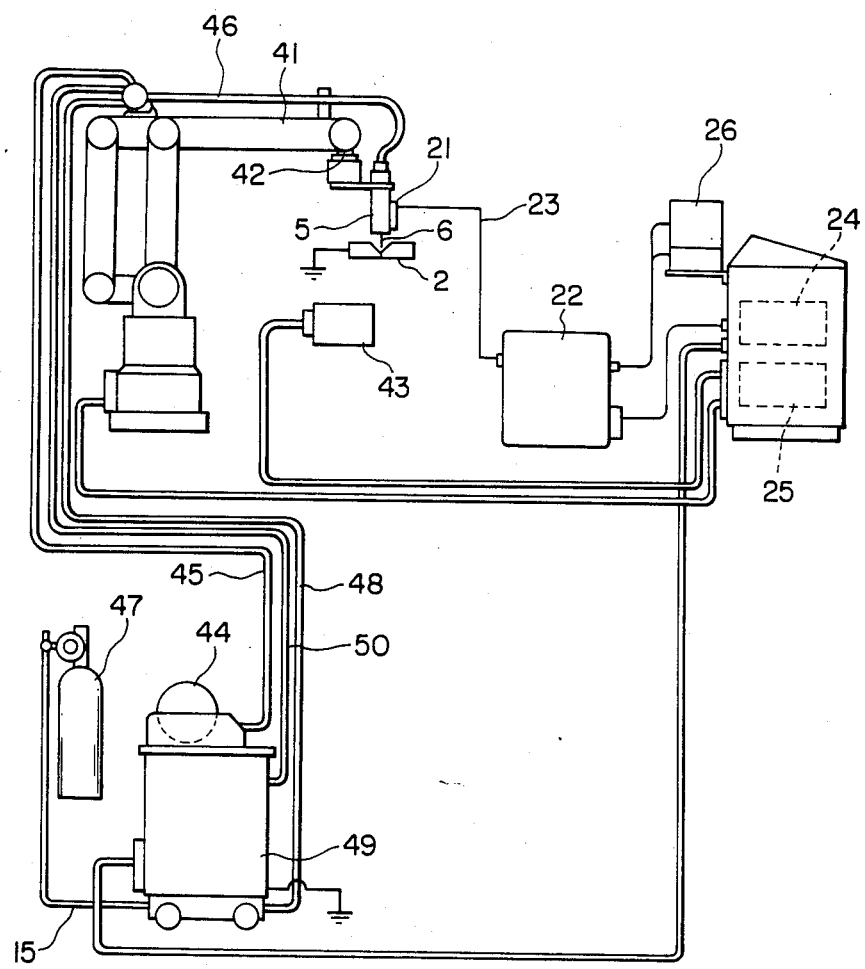
FIG. 2 is a schematic diagram showing the constitution of one example of a fully automatic arc welding robot to which a welding position detecting apparatus of the present invention is applied.

FIG. 2 shows the constitution of one example of a fully automatic arc welding robot to which the welding position detecting apparatus of the present invention is applied.

The welding torch 5 is fixed to the wrist 42 of the arc welding robot 41. The detecting apparatus 21 of the present invention which contains the the fine converging ray emitting optical system 11 together with the observing optical system 12 is arranged around the welding torch 5. Both image signals of the arc image and the groove face crossing ray image obtained in the detecting apparatus 21 are fed to an image processor 22 through a signal cable 23. In the image processor 22, each of the arc image and the groove face crossing ray image is processed in a given way about its recorded image signal included in a particular range. The position of the groove face of work piece is detected on the basis of the groove face crossing ray image, and the detecting signal thereby obtained is transmitted to a robot controller 24. The information on the arc such as that regarding the amounts of bending and extension of the welding wire 6 is detected on the basis of the arc image, and the detecting signal obtained is transmitted through a cable to the robot controller 24 and to a welding machine controller 25. The outcome of the process in the image processor 22 is indicated in a monitor 26.

An instruction box 43 teaches the arc welding robot 41 the route of welding. The welding wire 6 is supplied from a bobbin frame 44 to the welding torch 5 through a cable guide 45 and a conduit cable 46. The shield gas used in the process of welding is supplied from a gas container 47 to the welding torch 5 through a cable 48 and the conduit cable 46. The voltage and current required in the process of welding is supplied between the welding wire 6 and work piece 2 from a welding power source 49 through a cable 50 and the conduit cable 46. The robot controller 24 controls the position of the welding torch 5 on the basis of the information on the arc and the position of the groove face. Similarly, the welding machine controller 25 carries out control of the welding current supplied to the welding wire 6 and of the arc voltage.

In the welding robot above described, the arc image and the groove face crossing ray image are received by one detecting apparatus 21 having one detector 12a, that is, by a detecting apparatus which is a simple in construction and small in size. By observing the groove face crossing ray image, the welding line can be detected, while the amounts of extension and bending of the welding wire 6 during the process of welding are detected by observing the arc image, and the position of the welding torch 5 can be controlled by tracing the welding line. Highly accurate determination of the point of welding is then possible, and the welding work is performed in a proper welding condition by virtue of the information of the arc.

Figure 3:
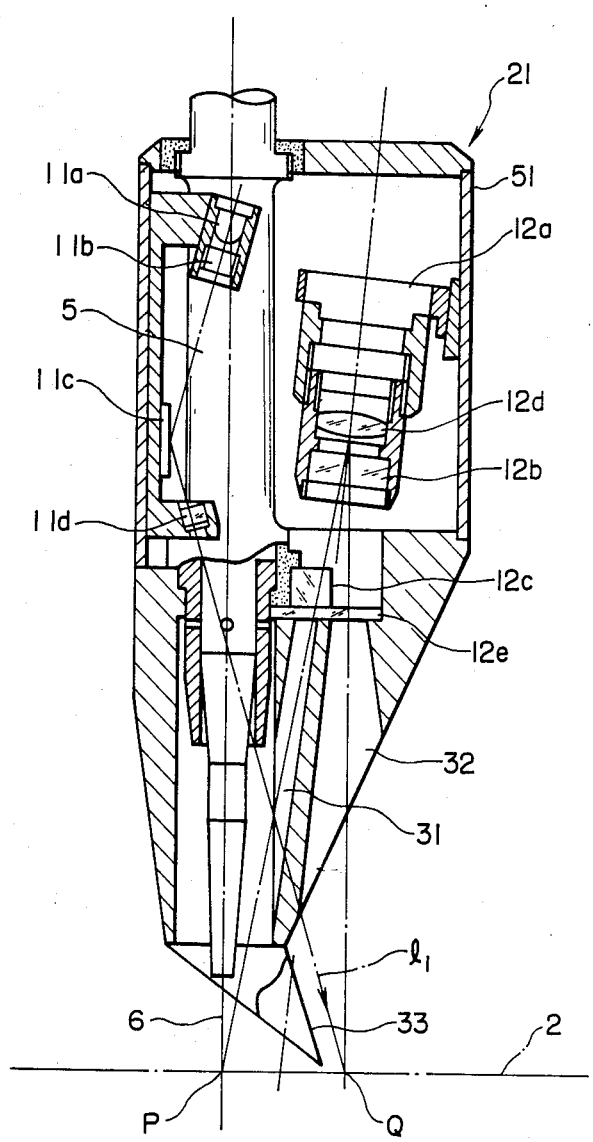
FIG. 3 and 4 are cross-sectional views respectively showing concrete constructions of the present invention.

FIG. 3 concretely shows the welding position detecting apparatus of the present invention (shown in FIG. 2 as a detecting apparatus 21).

A frame body 51 is provided around the welding torch 5 such as to accommodate the same. The fine converging ray emitting optical system 11, which is composed of a light emitting element 11a such as a laser diode, etc., a condenser lens 11b for giving directionality to a light emitted from this light emitting element 11a, a mirror 11c and a cylindrical lens 11d, is provided inside the frame body 51. In this case, a pair of the optical systems 11 are provided (one of them is omitted in the figure) in a symmetrical relationship with each other and with the welding torch 5 interposed therebetween. This pair of optical systems are arranged such that the lights $l_1$ respectively emitted from the optical systems 11 constitute the same plane surface.

The observing optical system 12, which is composed of the detector 12a, the interference filter 12b, extinction-filter 12c, a lens 12d and a heat-resistant glass plate 12e, is also provided inside the frame body 51.

In the above described apparatus of the present invention, the detector 12a detects the arc image of an arc portion including the tip of the welding wire 6 by introducing the arc passing through a first cylindrically shaped opening 31 in the frame body into the detector 12a through the heat-resistant glass 12e, the extinction-filter 12c, the interference filter 12b and the lens 12d. The first opening 31 is arranged such that the arc image of an arc portion including the tip of the welding wire 6 is alone permitted to pass through it so as to be introduced into the detector 12a. While detecting the arc image, the detector 12a detects the groove face crossing ray image by introducing a reflective light which reflects on the crossing ray line Q and passes through a second opening 32 formed in the frame body 51 into the detector 12a through the heat-resistant glass 12e, the interference filter 12b and the lens 12d. The second opening 32 is arranged such that the groove face crossing ray image alone is permitted to pass through the second opening 32 so as to be introduced into the detector 12a. The optical axis of the lens 12d crosses the crossing ray line Q at its center point, the detector 12a and the lens 12d thus being so disposed that the both images immediately come into the field of view of the detector 12a. A shield plate 33 as shown in the figures is provided for the purposes of preventing spatters and fumes from intruding into the field of view within which the groove face crossing ray image is detected. Thanks to this provision, the groove face crossing ray image can be seen more distinctively.

According to the concrete constitution described above and shown in FIG. 3, the effects which may be realized from this invention are as follows.

(1) The image of the arc portion including the tip of the welding wire 6 is alone led through the narrow opening 31 and observed, other images being excluded, so that the image processing which is performed when the positions of the arc point P and the tip of the welding wire 6 are determined becomes easier to perform;

(2) the groove face crossing ray image which approximates to the arc point P is obtained by introducing the arc image and the groove face crossing ray image into the observational field of view of the detector 12a, and the overall size of the apparatus can thus be reduced; and (3) neither of the images formed on the receiving surface of the detector 12a overlaps the other, thus forming discrete images, so that the image processing may be performed merely in the image area which is proper to each image and the structure of the process is thus simplified.

Figure 4:
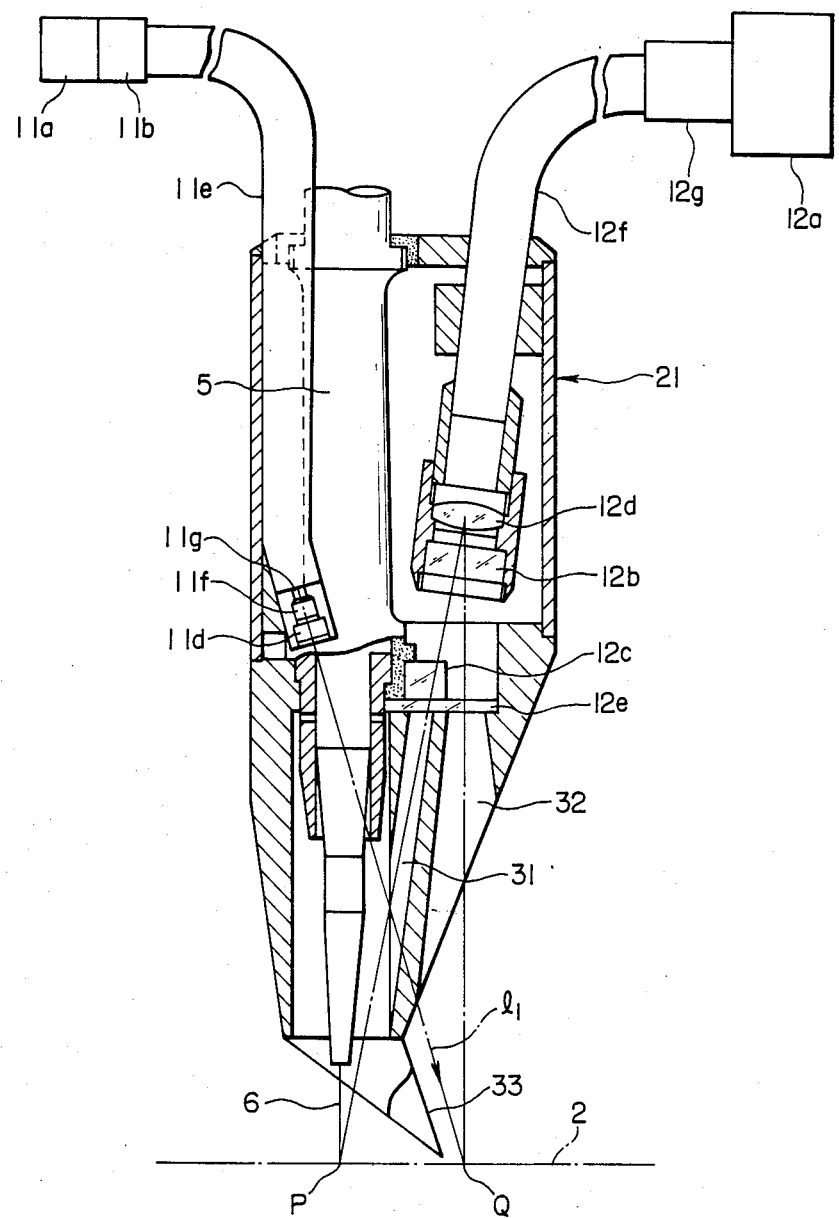

FIG. 4 shows in section another example of the apparatus according to the present invention. In this example, the fine converging ray emitting optical system 11 is composed of a light emitting element 11a placed outside a hollow frame body 51, a condenser lens 11b, a cylindrical lens 11d provided inside the hollow frame body 51, an optical fiber cable 11e for conducting the light $1_1$ of the emitting element 11a to the side of the cylindrical lens 11d, and a lens for converting light, which diverges at the end surface 11g of the optical fiber 11e, into a beam. The observing optical system 12 is composed of: a detector located outside the hollow frame body 51; an interference filter 12b, an extinction-filter 12c, lens 12d and a heat-resistant glass 12e, which are disposed inside the hollow frame body 51; an optical fiber cable 12f conducting the arc image and the groove face crossing ray image, which is formed by raying with a fine converging ray, into the detector 12a through the lens 12d; and an ocular 12g forming the image, which is transmitted through the optical fiber cable 12f, on the receiving surface of the detector 12a.

In the example described above and shown in FIG. 4, the optical fiber cables 11e and 12f are applied as transmitting paths of lights (images) in the optical systems 11 and 12, and the detector 12a and the light emitting element 11a are so positioned as to be distanced from the welding torch 5. One advantage of this example is that the influence of disturbance such as by heat and electricity on the detector 12a and the light emitting element 11a is lowered.

As described above, the amounts of extension and bending of the welding wire can be detected by the apparatus of the present invention, which is at the same time applied to the detection of the welding line, and which achieves these advantages with its simple construction and in its small size. It can effectively work when used in an automatic arc welding robot.

What is claimed is:

1. A welding position detecting apparatus for detecting a position of a workpiece to be welded and a position of a welding wire supplied from a welding torch, comprising;
    a fine converging ray emitting optical system for irradiating a groove face of the workpiece with an emitted fine converging ray at a position in advance of an arc position where an arc is generated during welding of the groove face so as to form a groove face crossing ray image; and
    an observing optical system for receiving the groove face crossing ray image and an arc image including an image of the arc generated during welding and an image of a tip end portion of the welding wire and for providing output image signals indicative thereof;
    wherein said observing optical system includes first light passage means for receiving and passing the arc image of the arc generated during welding and the tip end portion of the welding wire, and second light passage means for receiving and passing the groove face crossing ray image, partition means for separating said first and second light passage means from each other, and receiving means coupled to said first and second light passage means for enabling said arc image of the arc generated during welding and the tip end portion of the welding wire and said groove face crossing ray image to simultaneously appear within the same visual field of said observing optical system and for providing the output image signals indicative thereof.

2. A welding position detecting apparatus according to claim 1, wherein said fine converging ray emitting optical system includes a light emitting element and an optical means for converting a light, which is emitted from said light emitting element, into a fine converging ray.

3. A welding position detecting apparatus according to claim 1, wherein receiving means of said observing optical system has a detecting means for detecting said arc image and said groove face crossing ray image at the same time.

4. A welding position detecting apparatus according to claim 1, wherein said fine converging ray emitting optical system and said observing optical system are respectively provided with optical fiber cables as transmitting paths of a ray and an observed image.

5. A welding position detecting apparatus according to claim 1, wherein said first light passage means includes an extinction filter for diminishing a light intensity of said arc image.

6. A welding position detecting apparatus according to claim 1, wherein said observing optical system is disposed on a side of said welding torch so that said observing optical system is inclined with respect to an axis of said welding torch toward the direction in which welding proceeds at a center of the tip end of the welding wire.

7. A welding position detecting apparatus for detecting a position of a workpiece to be welded and a position of a welding wire supplied from a welding torch, comprising:
    a frame body secured to said welding torch;
    a fine converging ray emitting optical system disposed within said frame body for irradiating a groove face of the workpiece with an emitted fine converging ray at a position in advance of an arc position when an arc is generated during welding of the groove face so as to form a groove face crossing ray image; and
    an observing optical system for receiving the groove face crossing ray image and an arc image including an image of the arc generated during welding and an image of a tip end portion of the welding wire and for providing image signals indicative thereof;
    wherein said observing optical system includes first light passage means for receiving only the arc image of the arc generated during welding and the tip end portion of the welding wire, and second light passage means for receiving and passing only the groove face crossing ray image, partition means within said frame body for separating said first and second light passage means from each other, and receiving means coupled to first and second light passage means for enabling said arc image including the arc generated during welding and the tip end portion of the welding wire and said groove face crossing ray image to simultaneously appear within the same visual field of said observing optical system and for providing the output image signals indicative thereof.

8. A welding position detecting apparatus according to claim 7, wherein said fine converging ray emitting optical system includes a light emitting element and an optical means for converting a light, which is emitted from said light emitting element, into a fine converging ray.

9. A welding position detecting apparatus according to claim 7, wherein said receiving means of said observing optical system has a detecting means for detecting said arc image and said groove face crossing ray image at the same time.

10. A welding position detecting apparatus according to claim 7, wherein said fine converging ray emitting optical system and said observing optical system are respectively provided with optical fiber cables as transmitting paths of a ray and an observed image.

11. A welding position detecting apparatus according to claim 7, wherein said first light passage means includes an extinction filter for dimishing a light intensity of said arc image.

12. A welding position detecting apparatus according to claim 7, wherein said observing optical system is disposed on a side of said welding torch so that said observing optical system is inclined with respect to an axis of said welding torch toward the direction in which welding proceeds at a center of the tip end of the welding wire.

13. A welding position detecting apparatus according to claim 7, wherein a lower end portion of said frame body is provided with a shield plate for preventing weld material and welding fumes from entering said second light passage means.

14. A welding position detecting apparatus according to claim 12, wherein said observing optical system is disposed on a side of said welding torch so that said observing optical system is inclined with respect to an axis of said welding torch toward the direction in which welding proceeds at a center of the tip end of the welding wire.

* * * * *